United States Patent
Lee

(10) Patent No.: US 12,221,062 B1
(45) Date of Patent: Feb. 11, 2025

(54) MOTOR VEHICLE THEFT PROTECTION AND DISABLEMENT SYSTEM

(71) Applicant: Kao Lee, Cottage Grove, MN (US)

(72) Inventor: Kao Lee, Cottage Grove, MN (US)

(73) Assignee: Shongkawh LLC, Cottage Grove, MN (US)

( * ) Notice: Subject to any disclaimer, the term of this patent is extended or adjusted under 35 U.S.C. 154(b) by 0 days.

(21) Appl. No.: 18/787,927

(22) Filed: Jul. 29, 2024

(51) Int. Cl.
B60R 25/045 (2013.01)
B60R 25/31 (2013.01)
B62H 5/08 (2006.01)

(52) U.S. Cl.
CPC ............ *B60R 25/045* (2013.01); *B60R 25/31* (2013.01); *B62H 5/08* (2013.01)

(58) Field of Classification Search
CPC ....... B60R 25/045; B60R 25/31; B60R 25/20; B60R 25/1001
USPC ........................................................... 701/2
See application file for complete search history.

(56) References Cited

U.S. PATENT DOCUMENTS

| | | | |
|---|---|---|---|
| 5,307,048 A | 4/1994 | Sonders | |
| 5,706,399 A | 1/1998 | Bareis | |
| 5,912,615 A * | 6/1999 | Kretzmar | B60R 25/104 340/428 |
| 5,977,654 A * | 11/1999 | Johnson | B60R 25/04 307/10.3 |
| 6,498,970 B2 | 12/2002 | Colmenarcz et al. | |
| 6,720,862 B2 * | 4/2004 | Hazelton | B60R 25/24 307/10.3 |
| 6,822,558 B1 * | 11/2004 | Haderer | B60R 11/0205 340/426.11 |
| 8,436,721 B1 | 5/2013 | Lee et al. | |
| 9,199,609 B2 | 12/2015 | Rasal | |
| 9,561,779 B2 | 2/2017 | Rasal | |
| 10,166,995 B2 | 1/2019 | Beauvais | |
| 10,691,321 B2 | 6/2020 | DeBates et al. | |
| 2002/0097145 A1 | 7/2002 | Tumey et al. | |
| 2013/0263291 A1 * | 10/2013 | Ohman | G08B 13/1418 726/35 |
| 2013/0300550 A1 * | 11/2013 | Potter | B60R 25/20 340/429 |

(Continued)

FOREIGN PATENT DOCUMENTS

CN 201751248 A1 2/2011
CN 202686280 A1 1/2013

(Continued)

OTHER PUBLICATIONS

Huaqun et al., "An Automotive Security System for Anti-theft," 2009, Publisher: IEEE.*

(Continued)

*Primary Examiner* — Tuan C To
(74) *Attorney, Agent, or Firm* — Berggren Law Offices LLC; William R. Berggren

(57) ABSTRACT

A motor vehicle theft protection and disablement system that is safe, not easy to circumvent, and offers benefits to motor vehicle owners as an incentive for their participation. The core of the invention is a system to minimize motor vehicle theft. The system comprises six elements, a motor vehicle, a programmable safety switch, a programmable transmitter, a programmable security switch, a programmable activator, and at least one remote programmable receiver transmitter.

20 Claims, 6 Drawing Sheets

(56) References Cited

U.S. PATENT DOCUMENTS

2017/0072908 A1* 3/2017 Liubakka ............. G07C 9/0069
2020/0001828 A1* 1/2020 Loeffler ................ B60C 23/06
2020/0298798 A1* 9/2020 Yamamoto ............ G08B 25/10

FOREIGN PATENT DOCUMENTS

| CN | 104802748 A1 | 7/2015 | | |
|---|---|---|---|---|
| CN | 106218581 A1 | 12/2016 | | |
| CN | 105882605 A1 | 6/2019 | | |
| EP | 3239026 A1 | 11/2017 | | |
| GB | 2335002 A | * | 9/1999 | ........... B60R 25/102 |
| IN | 201911054343 A1 | 1/2020 | | |
| JP | 2007076416 A1 | 3/2007 | | |
| KR | 102265624 B1 | 6/2021 | | |
| MX | 2019015751 A1 | 6/2021 | | |
| WO | 2014141700 A1 | 9/2014 | | |

OTHER PUBLICATIONS

Vijayalakshmi et al., "Anti-Theft Face Recognition and Alcohol Detection Car Ignition System," 2023, Publisher: IEEE.*
Kingshuk Mukherjee, "Anti-theft vehicle tracking and immobilization system," 2014, Publisher: IEEE.*
Ch.Bhanu Prakash and K. Sirisha, Design and Implementation of a Vehicle Theft Control Unit using GMS and CAN Technology, International of Innovative Research in Electronics and Communications (IJIREC). vol. 1, Issue 4, Jul. 2014.

* cited by examiner

MOTOR VEHICLE THEFT PROTECTION AND DISABLEMENT SYSTEM

FIELD OF THE INVENTION

This invention relates to anti-theft apparatus and motor vehicle disablement devices when unauthorized activity occurs.

BACKGROUND OF THE INVENTION

There is a need for an improved system to disable the operation of a motor vehicle to prevent theft and unauthorized activity.

Various means have been presented to the public to disable motor vehicles. Some prevent operation of a motor vehicle's electrical system if a predetermined identification number is not first entered. Others rely on communication signals from other locations apart from the motor vehicle to activate a disabling sequence to stop the motor vehicle from operating by turning off its ignition system or stopping the flow of fuel to the engine. Still others rely upon remotely activated systems that control the steering wheel, brake pedal, gas pedal and transmission control. Some systems also delay disablement until a motor vehicle is being refueled, parked or towed to provide safety to other nearby motor vehicles.

These systems are not adequate. Many often require governmental approval and require significant governmental infrastructure without offering owners much incentive. Others focus on shutting off ignition systems between the key insertion port and the starter motor or stopping the flow of fuel to an engine. The former is easily circumvented, and the latter is hazardous.

U.S. Pat. No. 8,436,721 ('721) addresses these problems mentioned above for automobiles. However, use of a keypad transmitter be problematic for some who may have memory and manual dexterity problems as well as may have eventual security problems as code breaking technology continues to evolve.

Various systems are known to try to increase the security of starting a car. These involve facial image recognition, gestures and voice, speech recognition. biometrics, and fingerprint to increase security. Growing use of and capabilities of the internet together with a growing evolution of capabilities of artificial intelligence lessens the security value of these methods over time.

Motorcycles are also subject to theft and in need of a theft protection and disablement system.

There is still a need for a motor vehicle disabling system that prevents theft, is safe and not easily circumvented, and avoids extensive governmental incentives to encourage owner acquisition.

SUMMARY OF THE INVENTION

We have invented a motor vehicle theft protection and disablement system that is safe, less easy to circumvent, and offers more benefits to motor vehicle owners as an incentive for their participation. The core of the invention is a system to deter motor vehicle theft. The motor vehicle theft protection and disablement system comprises six elements, a motor vehicle, a normally open programmable safety switch, a programmable transmitter, a programmable activator, a programmable security switch, and at least one remote programmable receiver transmitter.

The first element, the motor vehicle, includes a pressure detector in communication with a driver seat, and an engine and an electrical circuit in electrical communication with the engine. The motor vehicle also includes a battery in electrical communication with the engine and an engine control module in electrical communication with the battery and the engine. The engine control module controls factors that permit the engine to start, stop or run, e.g., it is a type of electronic control unit that determines the amount of fuel, electrical current to adjust speed, ignition timing and other parameters an internal combustion engine needs to keep running, that determines the amount of electrical current at what frequency and other parameters that an electric engine needs to keep running, or that determines the amount of fuel, ignition timing, electrical current to adjust speed and other factors and the amount of electrical current at what frequency and other parameters that a hybrid internal combustion and electric engine needs to keep running. The circuit also includes an input connector between and in electrical communication with both the battery and the engine control module and an output connector between and in electrical communication with both the engine control module and the engine.

The second element, the normally open programmable safety switch, is electrically connected to the electrical circuit of the motor vehicle, in electrical communication with the engine control module, and configured to know if the engine is running or not running. The normally open programmable safety switch has an open position that prevents power from being able to turn on the engine and a closed position that permits power to be able to turn on the engine. The normally open programmable safety switch is configured to achieve a closed position upon reception of a voluntary first communication signal and achieve an open position upon reception of an automatic second communication signal when the engine is turned off.

The third element, the programmable transmitter. comprises a processor and is in electrical communication with the electrical circuit of the motor vehicle and the normally open programmable safety switch. The programmable transmitter is configured to transmit the voluntary first communication signal to the normally open programmable safety switch to achieve a closed position and allow the engine of the motor vehicle to be turned on through conventional means upon the input of a voluntary predetermined complex activation third communication signal from a group consisting at least of a predetermined negative image of a person's own face to the processor in the programmable transmitter.

The fourth element, the programmable activator, is in electrical communication with the processor of the programmable transmitter and configured to transmit on demand to the processor in the programmable transmitter the voluntary predetermined complex activation third communication signal.

The fifth element, the programmable security switch, is a normally closed programmable security switch that comprises four features. Firstly, it is in electrical communication with the normally open programmable safety switch and the electrical circuit of the motor vehicle, and able to detect when the normally open programmable safety switch achieves a closed position, the engine has been turned on, and the pressure detector that is in communication with a driver seat. Secondly, it has an open position that prevents power from running the engine and a closed position that does not prevent power from running the engine. Thirdly, it is configured to achieve the open position upon reception of (a) a voluntary predetermined fourth communication signal from a first remote programmable receiver transmitter or (b) an automatic predetermined fifth signal showing that the pressure on the driver seat does not register at least a predetermined amount of pressure showing the diver seat is not occupied, and the engine is running for a predetermined period of time after a pressure on the pressure detector is below at least a predetermined amount of pressure. Fourthly, it is configured to achieve the closed position from the open position upon reception of a voluntary, predetermined, and complex sixth communication signal from the group consisting at least of a predetermined negative image of a person's own face from the first remote programmable receiver transmitter.

The sixth element, the first remote programmable receiver transmitter, is in electrical communication with the normally closed programmable security switch and the electrical circuit of the motor vehicle. The first remote programmable receiver transmitter is configured (1) to be able to transmit on demand the voluntary predetermined fourth communication signal to the normally closed programmable security switch to move the normally closed programmable security switch to the open position and (2) to be able to transmit on demand when the normally closed programmable security switch is in the open position the voluntary predetermined complex sixth communication signal to the open but normally closed programmable security switch to move it to the closed position.

As used herein:

"Authority switch" means a switch that is voluntarily closed by receiving a signal from a remote transmitter and may be opened by receiving a voluntary signal from a remote programmable receiver transmitter.

"Engine control module" means a type of electronic control unit that determines the amount of fuel, ignition timing and other parameters an internal combustion engine needs to keep running, that determines the amount of electrical current at what frequency and other parameters an electric engine needs to keep running, or that determines the amount of fuel, ignition timing and other factors and the amount of electrical current at what frequency and other parameters a hybrid internal combustion and electric engine needs to keep running.

"Motor vehicle" is any vehicle comprising an electrical engine control module, such as, for example, a truck, an automobile, or a motorcycle, and may include motor vehicles driven by an internal combustion, an electric engine, or a hybrid internal combustion and electric engine.

"Programmable safety switch" means a normally open switch that is closed by receiving a voluntary first communication signal from a programmable transmitter to allow the engine to be turned on and operate and is opened by receiving an automatic second communication signal when the engine is not running to prevent the motor vehicle from being turned on.

"Programmable transmitter" means a wired or wireless transmitter able to transmit a voluntary first communication signal upon receipt of an activation communication and is not considered a remote transmitter.

"Programmable activator" means a wired or wireless transmitter able to transmit a predetermined complex activation third communication signal to the programmable transmitter, may deactivate or activate the programmable transmitter, and is not considered a remote transmitter.

"Programmable security switch" means a normally closed switch that is open to stop a motor vehicle when (1) a security issue occurs such as, for example, a voluntary predetermined fourth communication signal is received from a remote programmable receiver transmitter, (2) an automatic predetermined fifth signal is received when a pressure monitor registers the absence of a person on a driver seat when the programmable safety switch is closed and the engine is running, or (3) an automatic predetermined fifth signal is received when a pressure monitor registers the absence of a person on a driver seat and the kickstand is retracted when the programmable safety switch is closed and the engine is running.

"Remote programmable receiver transmitter means a remote device configured to transmit a predetermined complex activation communication signal to the programmable security switch to be open to stop a running motor vehicle or be closed to allow the programmable activator to function as intended, and is configured to be able to transmit the seventh communication signal to the normally closed automatic security switch that is open to move it to a closed position again.

"Valet switch" means a wired or wireless bypass switch able to transmit a voluntary predetermined complex activation seventh communication signal to the programmable transmitter for a predetermined period of time, keep the normally closed programmable security switch in a closed position while in use, and not be considered a remote transmitter but a bypass switch. The voluntary predetermined complex activation seventh communication signal may be the same as the voluntary predetermined complex third communication signal or may be a different voluntary predetermined complex communication signal and is not considered a remote transmitter.

The invention offers several benefits over what has been known to the art. The invention is resistant to evolving hacking techniques assisted with increasing internet capabilities and artificial intelligence capabilities such as tracking or distance starting of the motor vehicle. Also, programmable predetermined signals or data link rather than keypads minimize not starting the car because the driver forgot he keyed code to activate a keypad transmitter as taught in '721. This invention is useful for any motor vehicle that has an engine control module or its equivalent such as, for example, trucks, cars and motorcycles. It is useful for motor vehicles with engines that are internal combustion, electric or a hybrid of both. The invention minimizes loss of a vehicle by carjacking, truck-jacking, hijacking, motorcycle-jacking, or other motor vehicle theft while the motor vehicle is in sight out of sight, left with the key forgotten in the ignition or, left while unattended idling.

BRIEF DESCRIPTION OF THE DRAWINGS

An embodiment of the invention is described in the accompanying drawings. The drawings are briefly described below.

Figure 1:
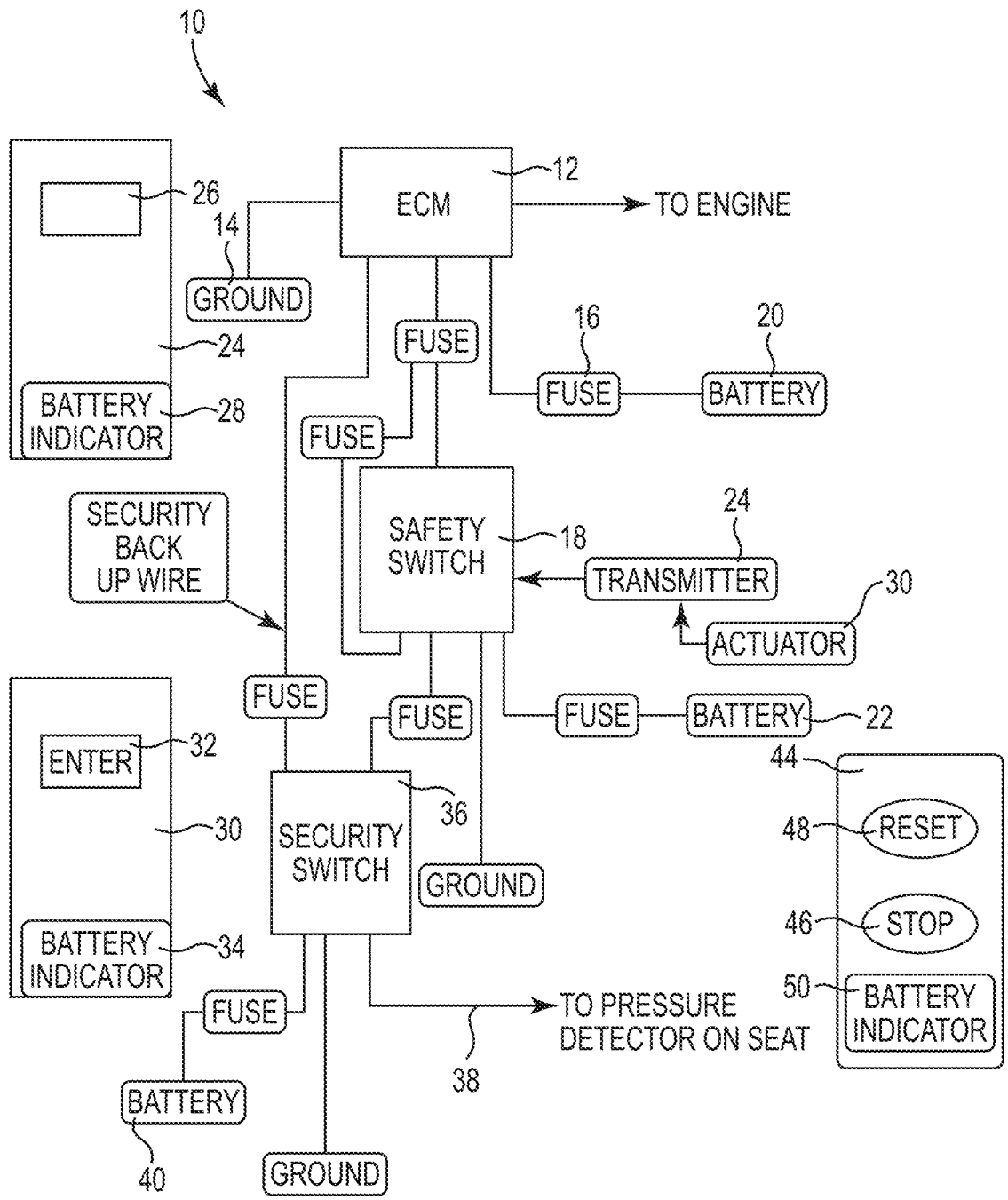
FIG. 1 is a schematic of an embodiment of the invention containing a programmable safety switch and a programmable security switch and the motor vehicle has a pressure detector in communication with a driver seat.

The above drawings are illustrative only, and changes may be made in the specific construction illustrated and described within the scope of this application. While the invention is amenable to various modifications and alternative forms, specifics thereof have been shown by way of example in the drawings and will be described in detail below. It is to be understood, however, that the intention is not to limit the invention to the embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

The apparatus we have invented is useful to prevent motor vehicle theft of cars and motorcycles, carjacking and to disable the motor vehicle when justified with minimal risk to others. In today's world, the pervasive auto theft problem transcends inconvenience, evolving into a significant global crisis with far-reaching implications. Millions of individuals fall victim to vehicle theft, which not only results in substantial financial loss but also imposes emotional distress on victims and families. Despite advances in technology and increased efforts by law enforcement agencies, the incidence of auto theft continues to climb, underscoring a dire need for more effective prevention approaches. The complexity of auto theft has deepened with the advent of different methods employed by criminals, ranging from high-tech hotwiring and key fob hacking to the more violent acts of carjacking and hijacking. Owners of motor vehicles often leave their motor vehicles parked outside of a garage or on a street. People desiring unauthorized rides in unattended motor vehicles owned by others appear to easily steal them by such techniques as, for example, hot-wiring the ignitions or key fob hacking. Cars that are not sold for parts are often abandoned and turn up in a police force impound lot. This also occurs for trucks and motorcycles but is less publicized. Owners then pay fees to retrieve the motor vehicle and more money to repair damage that may have resulted, often at their own expense. There is also a growing shipment of stollen motor vehicles to other locations including other countries. In addition, there is a growing theft by people as culture is becoming more permissive, especially in large cities, about property theft and police resources are being diverted to other more socially enforceable crimes.

Numeric key codes taught in '721 can become more problematic for two reasons, entering the codes and hacking the codes. Forgetting the numeric code can cause problems and delays for some. Difficulty in entering the code can be a problem for others with limited manual dexterity. Hacking is an evolving and growing concern that can accelerate an already increasing theft of and the more violent carjacking. As electronic measures for code breaking continue to evolve, numeric codes for keypads may become less secure from thieves.

In recent years, theft of automobiles has become more of a problem. Carjacking is becoming more prevalent, particularly in some areas of large cities. Carjackers often just enter a car while it is running and force the driver to exit before the thief drives off with the car. Because the car is running, the thief does not have to bother starting it or can easily do so again with the key that is in the ignition. Theft of unattended cars is also a problem. In both cases, those that are not sold to others or sold for their parts are often abandoned and appear in police impound lots, resulting in significant costs to the owner. In addition, in recent years, stolen cars are shipped in cargo containers to other countries.

Trucks are stollen but typically for the contents rather than the motor vehicle. However, there is a need to have the truck disabled to deter the theft.

Motorcycles are also involved in theft. Theft may occur when the ignition is hot-wired. It may also occur when a running motorcycle is stollen, by either being unattended by its driver or by its driver being removed from the seat of a motorcycle by a thief who then occupies the seat.

Other times stollen motor vehicles are involved in a chase where a motor vehicle thief is fleeing pursuit by police. These chases typically occur at high speeds with disregard for the safety of others. Damage to police vehicles and those of others is common. Also, injuries to police and others can occur.

Presently disclosed systems to address the above problems are inadequate. Some are complex. Others are easily circumvented by such techniques as, for example, hot-wiring the ignition. Still others are dangerous as they interrupt the flow of gasoline. Others only address some of the problems that owners can face. And some require oppressive governmental measures that are often considered intrusive by owners of vehicles. Thus, owners have little incentive to purchase and install those systems that are motor required by governmental action.

One of these systems taught in '721, addresses many of these problems but uses a keypad to activate the system and the motor vehicle is limited to those with doors such as automobiles rather than those without doors such as motorcycles. With the increased growth in and sophistication of computer technology, the keypad presents an increasingly less secure method of preventing theft. In addition, a keypad can cause problems when an owner under stressful circumstances is forced to rely on one's memory for the code. In addition, '721 is limited to a motor vehicle with a door such as, for example, an automobile or a truck and not motorcycles since they have no door.

We have invented a versatile system that satisfactorily addresses all of the above concerns. Use of our system significantly reduces the theft of an unattended motor vehicle and disables a motor vehicle that is being stolen while it is being attended by the owner or authorized driver. In addition, our system works for any motor vehicle with an engine control module, such as, for example, an automobile, a truck, and a motorcycle, whether they use engines that are internal combustion, electric or hybrid of internal combustion and electric. Our system also permits police to disable vehicles they are pursuing in a manner that minimizes danger to themselves and others once that aspect of our invention is allowed by governmental action or use of our system is sufficiently common to justify equipping authority with a suitable second remote programmable receiver transmitter.

Our system includes six elements, a motor vehicle, a programmable safety switch, a programmable transmitter, a programmable actuator, a programmable security switch, and at least one remote programmable receiver transmitter.

The first element, a motor vehicle, is readily available in the marketplace. The motor vehicle includes a pressure detector in communication with a driver seat, an engine, and an electrical circuit in electrical communication with the engine. The motor vehicle also includes a battery in electrical communication with the engine and an engine control module in electrical communication with the battery and the engine. The engine control module controls factors that permit the engine to start, stop or run, e.g., it is a type of electronic control unit that determines the amount of fuel, electrical current adjusted speed, ignition timing and other parameters an internal combustion engine needs to keep running, that determines the amount of electrical current at what frequency and other parameters that an electric engine needs to keep running, or that determines the amount of fuel, electrical current adjusted speed, ignition timing and other factors and the amount of electrical current at what frequency and other parameters that a hybrid internal combustion and electric engine needs to keep running. The circuit also includes an input connector between and in electrical communication with both the battery and the engine control module and an output connector between and in electrical communication with both the engine control module and the engine. In some embodiments, the first element includes at least one door. In some embodiments, the first element includes a speedometer and an acceleration device. In some embodiments, the first element includes a kickstand. In some embodiments, the electrical circuit further includes a fuse assembly containing at least one fuse to minimize damage that can be caused to sensitive electrical components by an undesirable surge of electrical power through the electrical circuit. This fuse assembly is often attached to the input connector to prevent the surge from passing through the engine control module and then to other electrical units.

The electrical circuit is independent of a keyed ignition switch or starter motor to start the engine until the normally open programmable safety switch is in the closed position. The keyed ignition switch or starter motor may be easily circumvented by thieves using such techniques as, for example, hot-wiring of the ignition because the normally open programmable safety switch must be moved to a closed position before either the keyed ignition switch or the starter motor are able to start the engine. Our invention does not involve use of the keyed ignition or starter motor to prevent theft. Thus, techniques such as hot-wiring of the ignition will have no adverse effect on the ability of our invention to be able to deter theft.

The second element, the normally open programmable safety switch, is electrically connected to the input connector in the electrical circuit of the motor vehicle, in electrical communication with the engine control module, and configured to know if the engine is running or not running. The normally open programmable safety switch has an open position that prevents power from being able to turn on the engine and a closed position that permits power to be able to turn on the engine. The normally open programmable safety switch is configured to achieve a closed position upon reception of a voluntary first communication signal and achieve an open position upon reception of an automatic second communication signal when the engine is turned off. Programmable switches are known, currently used in other devices unrelated to our invention, and readily available.

The third element, the programmable transmitter. comprises a processor and is in electrical communication with the electrical circuit of the motor vehicle and the normally open programmable safety switch. The programmable transmitter is configured to transmit the voluntary first communication signal to the normally open programmable safety switch to achieve a closed position and allow the engine of the motor vehicle to be turned on through conventional means upon the input of a voluntary predetermined complex activation third communication signal from a group consisting at least of a negative image of a person's own face to the processor in the fourth element, the programmable transmitter. The programmable transmitter is considered programmable because it transmits the voluntarily first communication signal to close the safety switch, when the processer has been programmed to receive the voluntary predetermined complex activation third communication signa. In some embodiments the programmable transmitter is physically wired to the normally open programmable safety switch. In other embodiments the programmable transmitter is in wireless communication with the normally open programmable safety switch. In some embodiments, the normally open programmable safety switch and the programmable transmitter are connected to the electrical circuit through the input connector. In some embodiments, the input connector further comprises a fuse and the normally open programmable safety switch is physically and electrically attached to the input connector between the fuse and the engine control module. Programmable transmitters are readily known to be used to change the state of programmable switches.

The fourth element, a programmable actuator, is in electrical communication with the processor of the programmable transmitter and configured to transmit on demand to the processor in the programmable transmitter the voluntary predetermined activation third communication from a group consisting at least of a randomly generated list of a predetermined number and type of to the programmable transmitter that has been programmed to receive the predetermined activation communication. This communication is designed to be difficult to reproduce by an adverse party with access to highspeed computers and the internet as currently known and likely envisioned in the near future. Motor vehicle theft has become more widespread in recent years as adverse parties make use of breakthrough technology that at times is outpacing the antitheft technology for even the most expensive motor vehicles. The programmable activator is located in the motor vehicle, typically easily accessible by a driver.

The fifth element, the programmable security switch, is a normally closed programmable security switch that comprises four features. Firstly, it is in electrical communication with the normally open programmable safety switch and the electrical circuit of the motor vehicle, and able to detect when the normally open programmable safety switch achieves a closed position, the engine has been turned on, the pressure detector in communication with the driver seat, and. Secondly, it has an open position that prevents power from running the engine and a closed position that does not prevent power from running the engine. Thirdly, it is configured to achieve the open position upon reception of (a) a voluntary predetermined fourth communication signal from a first remote programmable receiver transmitter or (b) an automatic predetermined fifth signal showing that a pressure on the pressure detector in communication with the driver seat does not register at least a predetermined amount of pressure showing the diver seat is not occupied, and the engine is running for a predetermined period of time after a pressure on the pressure detector is below at least the predetermined amount of pressure showing the diver seat is not occupied o. Fourthly, it is configured to achieve the closed position from the open position upon reception of a voluntary, predetermined, and complex sixth communication signal from the group consisting at least of a predetermined negative image of a person's own face from the first remote programmable receiver transmitter.

In some embodiments, the programmable security switch includes a programmable control apparatus electrically connected to a normally opened switch that is in electrical communication with the electrical circuit. In other embodiments the programmable function is physically within the switch assembly.

In some embodiments, the motor vehicle further comprises a wheel in a wheel assembly. The normally closed programmable security switch is also configured to have four additional features. Firstly, it is in electrical communication with the normally open programmable safety switch, the electrical circuit, the wheel and configured to be able to detect lack of motion of the wheel in the wheel assembly. Secondly, it has an open position that prevents power from running the engine and a closed position that does not prevent power from running the engine. Thirdly, it is further configured to achieve the open position upon reception of an automatic fifth signal showing that the pressure on the driver seat does not register at least a predetermined amount of pressure, the engine is running for a predetermined period of time after the pressure is below at least the predetermined amount of pressure and the wheel in the wheel assembly is not moving. Fourthly, it is configured to achieve a closed position upon reception of a predetermined complex activation sixth communication signal from the first remote programmable receiver transmitter.

The purpose of this embodiment is to increase factors that are averse to normal motor vehicle operation. The programmable security switch is automatically open when not only is the pressure on the driver seat does not register at least a predetermined amount of pressure, and the engine is running for a predetermined period of time after the pressure is below at least the predetermined amount of pressure, but also the wheel in the wheel assembly is not moving.

In some embodiments, the motor vehicle further comprises at least one door. The normally closed programmable security switch is also configured to have four additional features. Firstly, it is in electrical communication with the door, the normally open programmable safety switch, and the electrical circuit, and configured to be able to detect when the door is open while the normally open programmable safety switch is closed, and the engine is running for a preset amount of time. Secondly, it has an open position that prevents power from running the engine and a closed position that does not prevent power from running the engine. Thirdly, it is further configured to achieve the open position upon reception of an automatic eighth communication signal that the door is open, the normally open programmable safety switch is closed, and the engine is running for a predetermined amount of time. Fourthly, it is configured to achieve a closed position upon reception of a predetermined complex activation sixth communication signal from the first remote programmable receiver transmitter.

Motor vehicles with at least one door are typically automobiles or trucks. The predetermined time should be long enough to permit the legitimate driver to quickly open the door to retrieve something without the engine turning off. The predetermined should be short enough to prevent an adverse party entering the motor vehicle and stealing it. Timing is affected by such factors as rural or city settings and propensity of carjacking or truck theft.

The purpose of the automatic switch is to provide protection from carjacking superior to what has been previously disclosed. Other systems give control of disabling the vehicle to the owner or driver by means of a remote. Our system takes activation from the hands of the driver and makes it automatic when certain events occur. Specifically, our system requires that at least one door be opened while the safety switch be closed. Which door is opened or whether more than one door is opened is predetermined by the embodiment selected. Disablement then occurs within a preset amount of time beyond the conscience control of the driver. As soon as a thief opens a door of an occupied and running vehicle, the vehicle will be disabled within a predetermined amount of time. This feature also requires that the driver adopt safe driving habits and not open the door of the vehicle when it is running, or the vehicle will become disabled until the security switch is closed with the first remote transmitter receiver. Some embodiments may require that only the opening of driver door to activate the disablement. Other embodiments may require that the security switch be open when either front door is open. Still other embodiments may require the opening of any door to open the switch.

In some embodiments, the motor vehicle further comprises kickstand. The normally closed programmable security switch is also configured to have four additional features. Firstly, it is in electrical communication with the kickstand, the normally open programmable safety switch and the engine control module, and able to detect when the kickstand is extended or retracted, the normally open programmable safety switch is open, and the engine is running. Secondly, it has an open position that prevents power from running the engine when the kickstand is extended, the normally open programmable safety switch is closed, and the engine is running. Thirdly, it will achieve an open position upon reception of an automatic ninth communication signal that the kickstand is extended, the normally open programmable safety switch is closed, and the engine is running all for a preset time interval. Fourthly, it will achieve a closed position upon reception of a predetermined complex activation sixth communication signal from the first remote programmable receiver transmitter.

Motor vehicles with a kickstand generally are motorcycles. The predetermined time should be long enough to permit the legitimate driver to quickly open the door to retrieve something without the engine turning off. The predetermined time should be short enough to prevent an adverse party entering the motor vehicle and stealing it. Timing is affected by such factors as rural or city settings and propensity of carjacking or truck theft. The automatic nature takes the stress out of the legitimate driver and prevents an unauthorized person from taking the motorcycle.

The sixth element, the first remote programmable receiver transmitter, is in electrical communication with the normally closed programmable security switch and the electrical circuit of the motor vehicle. The first remote programmable receiver transmitter is configured (1) to be able to transmit on demand the voluntary predetermined fourth communication signal to the normally closed programmable security switch to move the normally closed programmable security switch to the open position and (2) to be able to transmit on demand when the normally closed programmable security switch is in the open position the voluntary predetermined complex sixth communication signal to the open but normally closed programmable security switch to move it to the closed position.

The first remote programmable receiver transmitter has a means to transmit the resetting communication and, optionally, a means to indicate power level or battery life as it is powered by a battery. It may be desirable that the driver does not carry the first remote programmable receiver transmitter on their person or within the vehicle as this would lessen system's deterrence to carjacking. However, if the legitimate driver accidentally activated the programmable security switch, and stopped the motor vehicle, restarting it may be time consuming if the first remote programmable receiver transmitter were not readily accessible. In addition, having the first remote programmable receiver transmitter on one's person permits the device to be used to stop a fleeing thief in the motor vehicle.

In some embodiments, the first remote programmable receiver transmitter has a means to indicate power level or battery life as it is powered by a battery. In some embodiments, the driver does not carry the first remote programmable receiver transmitter on their person or within the vehicle as this would lessen system's deterrence to carjacking. In some embodiments, the first remote programmable receiver transmitter may be concealed in the motor vehicle as thief may normally be rushed for time and not aware of the need for the first remote programmable receiver transmitter to start the motor vehicle. The first remote programmable receiver transmitter is considered two-way for purposes of this disclosure because it needs to receive a signal from the normally closed programmable security switch that it is open to transmit the voluntary predetermined complex sixth communication signal to the normally closed programmable security switch to move it to a closed position and allow the normally open programmable safety switch to operate as intended.

In some embodiments, the motor vehicle further comprises a speedometer and an acceleration device that is in electrical communication with the engine control module. The normally closed programmable security switch is also configured to have four additional states. Firstly, it is in electrical communication with the acceleration device and the normally open programmable safety switch, and configured to be able to receive the voluntary predetermined fourth communication signal when the motor vehicle needs to be stopped because of unauthorized use and the normally open programmable safety switch is closed. Secondly, it has an open position that is configured to cause the acts of (a) preventing power from accelerating the engine to decrease the speed of the motor vehicle to a predetermined amount and (b) stopping the running of the engine when the speed is below a predetermined level. Thirdly, it is configured to achieve within a preset time interval of the acts of (2) (a) and (2) (b) upon reception of the voluntary predetermined fourth communication signal. Fourthly, it is configured to achieve a closed position upon reception of the predetermined complex activation sixth communication signal from the first remote programmable receiver transmitter.

Motor vehicles with a speedometer and an acceleration device generally include all motor vehicles discussed in this document. When the legitimate driver sends a voluntary predetermined fourth communication signal from a first remote programmable receiver transmitter to the normally closed programmable security switch to open and stop the motor vehicle, the motor vehicle may be traveling as speeds that make stopping the motor vehicle unsafe for the thief or bystanders. In the above embodiment, the stopping is done in stages that are safer to all.

In some embodiments, the first remote programmable receiver transmitter of the motor vehicle theft protection and disablement system is further configured (3) to be able to start a motor vehicle from a distance of up to 300 feet. This is done by sending a voluntary predetermined complex tenth signal to turn off the programmable security switch, closing the programmable safety switch, and start the motor vehicle, and (4) when the door is opened, to be able to turn off the motor vehicle, turn on the programmable security switch and open the programmable safety switch.

In some embodiments, the motor vehicle theft protection and disablement system further comprises a WiFi engaged application in communication with the motor vehicle and the programmable security switch. The first remoter programmable receiver transmitter is further configured (5) to be able to show the location of the motor vehicle by being configured to send a voluntary complex eleventh signal to the application to enable the application to communicate the location of the motor vehicle to a display on the first remoter programmable receiver transmitter receiver and (6) send a voluntary fourth communication signal through the application to the programmable security switch to stop the motor vehicle as discussed above.

The voluntary predetermined complex third communication signal and the voluntary predetermined complex sixth communication signal should be sufficient as to significantly diminish the likelihood of a thief stealing the motor vehicle. As mentioned above, growing technology devices and hacking proficiency continually are being developed to decode security codes. We have developed several that appear reasonably secure and easy to implement.

Activation communication based on the negative image of an owner's own face is more secure than a key code on a keypad or other codes based upon one's image or other biometric data that may be easily obtained with current hacking technology. This is not readily copied from the internet interacting with computer models and represents a secure deterrent to theft. Using one's own image avoids copyright issues that may arise. The negative is not readily available in public sources or in medical data that is stolen, copied from the internet or copied with interactive computer models.

In addition, our invention also includes other activation communications that are currently less difficult to copy by adverse parties. These are predetermined and programed into the programmable activator and at least the first remote transmitter receiver to transmit and the normally open programmable safety switch and the normally closed programmable security switch to receive and not for a legitimate driver to memorize. In some embodiments, the voluntary predetermined complex third communication signal and the voluntary predetermined complex sixth communication signal, is changed with time and among groups to achieve greater security. This is not readily copied from the internet interacting with computer models and represents a secure deterrent to theft except by focused adversaries who specifically take the picture of an owner with a specialized camera in the view the owner is using.

In some embodiments, the voluntary predetermined complex third communication signal and the voluntary predetermined complex sixth communication signal are from a group further consisting of a generated list of a predetermined numbers type of characters or words of at least 50. This may be a random list of an ordered such as, for example, a phrase. It may include numbers, letters or characters such as, for example, %, &, *, or a mixture of one or more types of numbers, letters, and characters.

In some embodiments, the voluntary complex third communication signal and the voluntary predetermined complex sixth communication signal are from a group further consisting of a predetermined negative image of a predetermined thermal image of a person's own face. This is not readily copied from the internet interacting with computer models and represents a secure deterrent to theft except by focused adversaries who specifically take the picture of an owner with a specialized camera in the view the owner is using.

In some embodiments, the voluntary predetermined complex third communication signal and the voluntary predetermined complex sixth communication signal are from a group further consisting of a predetermined negative image of a range of wavelengths, a range of frequencies and an intensity. This is not readily copied from the internet interacting with computer models and represents a secure deterrent to theft.

In some embodiments, the voluntary predetermined complex third communication signal and the voluntary predetermined complex sixth communication signal are from a group further consisting of a predetermined negative image of a predetermined movement. This is not readily copied from the internet interacting with computer models and represents a secure deterrent to theft.

In some embodiments, the voluntary predetermined complex third communication signal and the voluntary predetermined complex sixth communication signal are from a group further consisting of a predetermined negative image of a predetermined inanimate or action image that is private and non-copyrightable such as a person's room, pet, or body part such as, for example, a hand, elbow, or knee that may be clothed or unclothed and that may be a normal, a negative, or a thermal image.

In some embodiments, the predetermined complex activation third communication signal and the predetermined complex activation sixth communication signal of the motor vehicle theft protection and disablement system may be the same. In some embodiments, the signals may be different. In some embodiments, the signals may be from the same group. In some embodiments, the signals may be from different groups.

In embodiments where the predetermined complex activation third communication signal and the predetermined complex activation sixth communication signal of the motor vehicle theft protection and disablement system may be the same, the programmable activator may be within the first remote programmable receiver transmitter. However, this embodiment is less secure to adverse theft than using different predetermined complex activation third communication signal and the predetermined complex activation sixth communication signal. Then the predetermined complex activation sixth communication signal activates the normally closed programmable security switch and a first remote programmable receiver transmitter is needed to start the motor vehicle.

A set-up module may be used to create predetermined complex activation signals that becomes the voluntary predetermined complex third communication signal and the voluntary predetermined complex sixth communication signal that is transferred into at least four elements of the invention to control activation of the motor vehicle engine. The programmable activator (the fourth element), and the first remote programmable receiver transmitter (the sixth element) are configured to transmit the voluntary predetermined complex third communication signal and the voluntary predetermined complex sixth communication signal, respectively, as previously described. The programmable transmitter (the third element) and the programmable security switch (the fifth element) are configured to receive the voluntary predetermined complex third communication signal and the voluntary predetermined complex sixth communication signal, respectively, as previously described. The set-up module may be used to create new complex activation signals that are copied to the copied to the four elements as described above when the owner desires to have different activation n signals used. In embodiments, the programmable activator may be configured to alter the activation communication at predetermined events when all four units are in close proximity.

As discussed above, the motor vehicle theft protection and disablement system has both voluntary aspects and automatic aspects that combine to increase the safety and security of the legal permitted driver of the motor vehicle.at a time where theft is rising. The voluntary aspects minimize the danger of undesirable theft of the motor vehicle in at least two situations. The first situation is when the owner or driver is not present, such as, for example, when the motor vehicle is parked on the street for the night while the owner/driver is asleep. The second situation is when the owner or driver is showing a second individual how to start the motor vehicle and the second person attempts to steal it without permission.

As discussed above, the automatic aspects of the programmable safety switch and programmable security switch relieve the legitimate driver from theft without any action needed by that driver. The programmable safety switch is opened when the motor vehicle is turned off and requires the voluntary predetermined complex third communication signal to start. The programmable security switch automatically turns off the motor vehicle when a driver seat is unoccupied and the engine is running, when a door is opened and the engine is running, and when the kickstand is extended, the normally open programmable safety switch is closed, and the engine is running.

The above-mentioned programmable safety switch and programmable security switch may be powered separately or by the vehicle. They may be individually powered by a battery or may be wired to the electrical system of the vehicle and powered by the vehicle battery. Also, one may be separately powered while the other may be powered by the vehicle battery.

It is important that the programmable safety switch and the programmable security switch be in a location in the vehicle that is not easily tampered with by a thief. Thus, each switch is affixed to the electrical circuit as previously described. All switches have the ability to disable the operation of the engine through interruption of the signals between the engine control module and the engine. Thus, the programmable safety switch and the programmable security switch may be in communication with the input connector, the output connector, or directly with the engine control module. The programmable safety switch and the programmable security switch may be arranged in series or in parallel with each other. In some embodiments, the switches are physically and electrically attached to the input connector. In some embodiments, the switches are physically and electrically attached to the input connector between a fuse and the engine control module. In still other embodiments, they are attached to the engine control module and not to either the input connector or the output connector.

In some embodiments, the motor vehicle theft protection and disablement system further comprise a valet switch allowing the vehicle to be operated by a valet during parking. A valet switch is a wired or wireless bypass switch able to transmit a voluntary predetermined complex activation seventh communication signal to the programmable transmitter for a predetermined period of time, keep the normally closed programmable security switch in a closed position while the valet switch is in use, and not be considered a remote transmitter but a bypass switch. The voluntary predetermined complex activation seventh communication signal may be the same as the voluntary predetermined complex third communication signal or may be a different voluntary predetermined complex communication signal. A bypass switch also known as a bypass TAP is a hardware device that provides a fail-safe access port for an in-line active security appliance such as an intrusion prevention system or next generation firewall. Active, in-line security appliances are single points of failure in live computer networks because if the appliance loses power, experiences a software failure, or is taken off-line for updates or upgrades, traffic can no longer flow through the critical link. The bypass switch or bypass tap removes this point of failure by automatically 'switching traffic via bypass mode' to keep the critical network link up.

An embodiment of the invention described above is shown in FIG. 1 as a schematic of an embodiment of the invention containing a programmable safety switch and a programmable security switch and the motor vehicle has a pressure detector in communication with a driver seat. A motor vehicle theft and disablement system (10) includes an engine control module or ECM (12) that is physically and electrically attached to an engine (not shown) of a motor vehicle (not shown and including an automobile, a truck, and a motorcycle). Grounds (14) and fuses (16) are shown on a representative basis and not meant to be comprehensive or limiting. In this embodiment, both a programmable safety switch (18) and a motor vehicle battery (20) are attached to ECM 12 to show that they are in electrical communication with ECM 12. However, in physical application, programmable safety switch 18 can be attached to the electrical circuit between motor vehicle battery 20 and ECM 12, and for some embodiments between the fuse box, denoted by fuse 16 attached to programmable safety switch 18 and ECM 12. In other embodiments, programmable safety switch 18 is physically attached to the electrical circuit between ECM 12 and the motor vehicle engine (not shown). In still other embodiments programmable safety switch 18 is within ECM 12. Programmable safety switch 18 is powered by a separate battery (22). A programmable transmitter (24) with a programmable processor (26) and powered by a separate battery with a battery indictor (28) to show how much power remains in programmable transmitter 24 is shown in wireless electrical communication with programmable safety switch 18. In some embodiments, the battery is battery 22 and the communication is wired. A programmable activator (30) is shown in electrical communication with programmable transmitter 24 through its programmable processor 26. Programmable actuator 30 has an enter button (32) in electrical communication to programmable processor 26 in programmable transmitter 24 to allow programmable transmitter 24 to send a predetermined complex third signal to the normally opened programmable safety switch 18 to close to allow the motor vehicle to be started by conventional means. Programmable actuator 30 is powered by a separate battery with a battery life indicator (34) to show how much power remains in programmable activator 30 and is shown in wireless electrical communication with programmable safety switch 24. A programmable security switch (36) is in electrical communication with both ECM 12 and programmable safety switch 18 in a manner able to detect if safety switch 18 is open or closed. Similar to programmable safety switch 18, programmable security switch 36 may physically be in the electrical circuit between motor vehicle battery 20 and ECM 12 and for some embodiments between the fuse box, denoted by fuse 16 attached to programmable security switch 36 and ECM 12. In other embodiments, programmable security switch 36 is physically attached to the electrical circuit between ECM 12 and the motor vehicle engine (not shown). In still other embodiments programmable security switch 36 is within ECM 12. A security wire (38) is attached between programmable security switch 36 and a pressure detector (not shown) that is electrically in communication with the driver seat such that programmable security switch 36 is able to receive a fifth communication signal when a pressure occurs below a preset pressure indicating the seat is not occupied while programmable safety switch 18 is open and the motor vehicle engine is running to open the programmable security switch 36 and stop the motor vehicle. Programmable security switch 36 is powered by another separate battery (40). A first remote programmable receiver transmitter (44) with a stop button (46) in wireless electrical communication with programmable security switch 36 to send on demand the voluntary predetermined fourth communication signal to the normally closed programmable security switch to move the normally closed programmable security switch 36 to the open position and stop the motor vehicle. First remote programmable receiver transmitter 44 also has a reset button (48) in wireless electrical communication with programmable security switch 36 to send on demand when the normally closed programmable security switch 36 is in the open position the voluntary predetermined complex sixth communication signal to the open but normally closed programmable security switch to move it to the closed position and allow the motor vehicle to operate normally with the programmable security switch 36 closed. First remote programmable receiver transmitter 44 is shown with a battery indicator (50) to show how much power remains in the remote programmable receiver transmitter.

Figure 2:
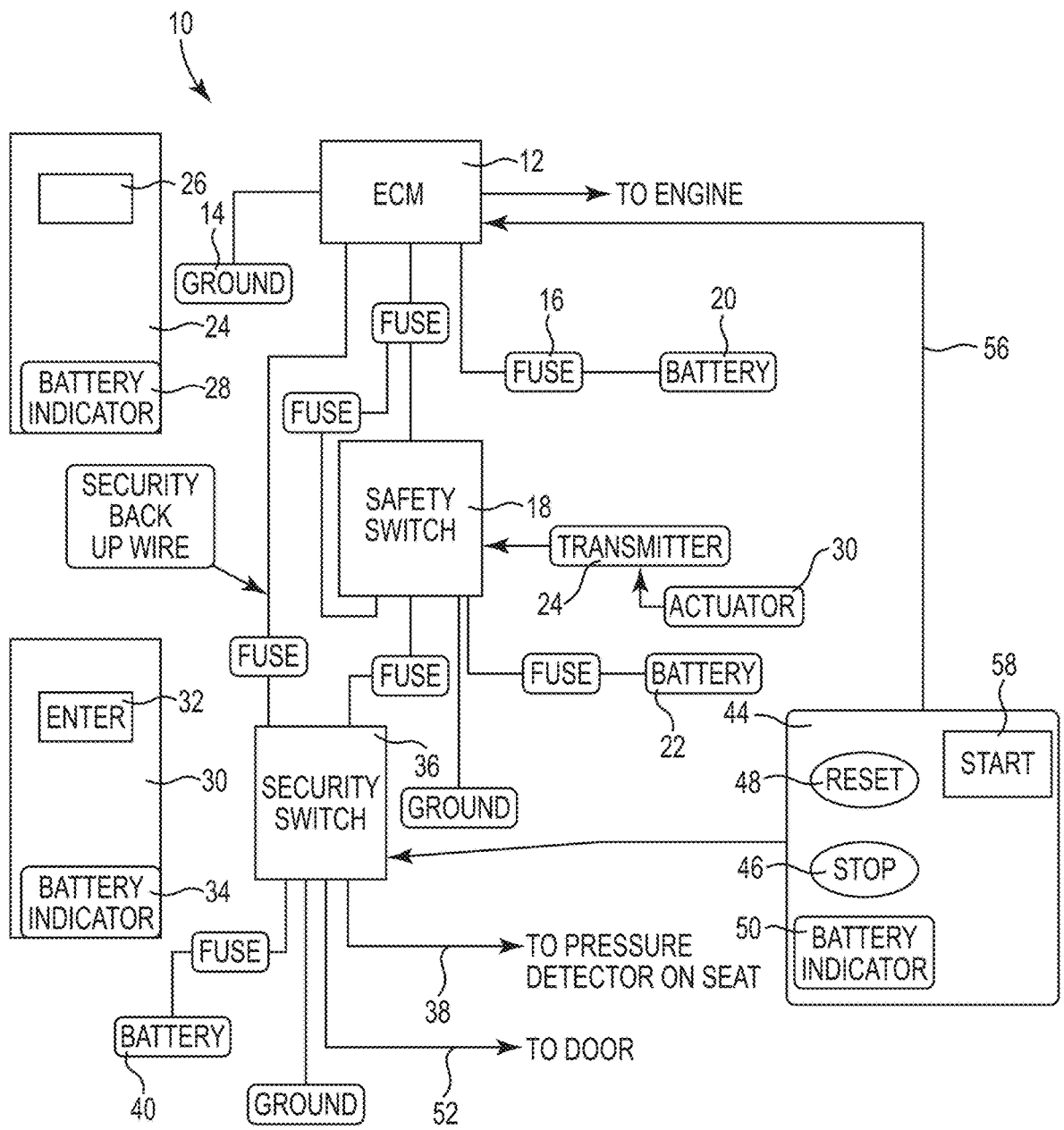
FIG. 2 is a schematic of an embodiment of the invention containing a programmable safety switch and a programmable security switch and the motor vehicle also has a driver door.

Another embodiment of the invention described above is shown in FIG. 2 as a schematic of an embodiment of the invention containing a programmable safety switch and a programmable security switch and the motor vehicle also has a driver door. The description of FIG. 2 is similar to that of FIG. 1 except for the following additions. The motor vehicle is one that also has a door, such as an automobile or a truck and not a motorcycle. Another security wire (52) also is attached between programmable security switch 36 and a driver door (not shown) such that programmable security switch 36 is able to receive an eighth communication signal when door is open for a predetermined amount of tome while programmable safety switch 18 is open and the motor vehicle engine is running to open the programmable security switch 36 and stop the motor vehicle. A remote start system (56) to remotely start a car, such as in winter, is shown in communication with ECM 12 and programmable security switch 32. First remote receiver transmitter 44 is shown also with a start button (58) to remotely start a car. When the start button is pressed, a voluntary predetermined complex tenth signal is sent to turn off the programmable security switch, close the programmable safety switch, and start the motor vehicle until the motor vehicle engine is turned off when the door is opened without a predetermined pressure on the seat.

Figure 3:
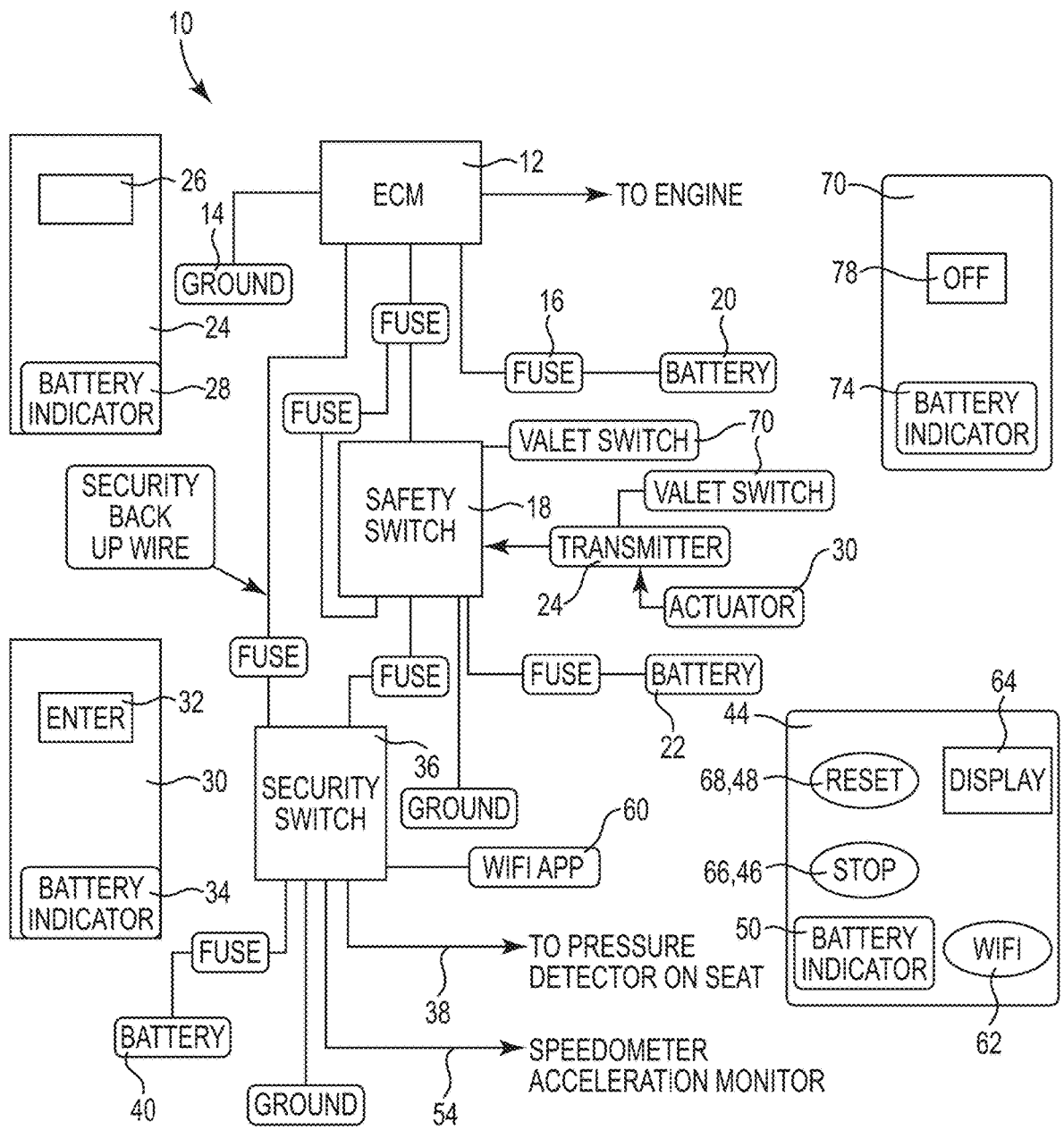
FIG. 3 is a schematic of an embodiment of the invention containing programmable safety switch and a programmable security switch and the motor vehicle also has a speedometer and an acceleration device that is in electrical communication with the programmable security switch.

Another embodiment of the invention described above is shown in FIG. 3 as a schematic of an embodiment of the invention containing programmable safety switch and a programmable security switch and the motor vehicle also has a speedometer and an acceleration device that is in electrical communication with the programmable security switch. The description of FIG. 3 is similar to that of FIG. 1 except for the following changes. The motor vehicle is one that also has a speedometer and an acceleration device in communication and is the same as in FIG. 1 except for the following additions. Another security wire (54) also is attached between programmable security switch 36 and a speedometer and an acceleration device (not shown) such that programmable security switch 36 is able to reduce speed until safe to stop motor vehicle when receiving a fourth communication signal from first remote programmable receiver transmitter. Also shown is a WiFi application (60) in communication with ECM 12 and programmable security switch 32. First remote receiver transmitter 44 is shown also with a WiFi activation button (62) configured to engage the WiFi connection with the sending of a voluntary predetermined complex activation eleventh communication signal, a WiFi location display (64), a WiFi remote stop button (66), and a WiFi remoter reset button (68). Also contained is a valet switch (70) that is a wired or wireless bypass switch able to transmit a voluntary predetermined complex activation seventh communication signal to programmable transmitter 24 for a predetermined period of time and keep the normally closed programmable security switch in a closed position while valet switch 70 is in use. Also shown on valet switch 70 is an OFF button (72) to send a voluntary predetermined complex activation seventh communication signal that the theft protection and disablement system is down for a predetermined amount of time, and a battery indicator (74).

Figure 4:
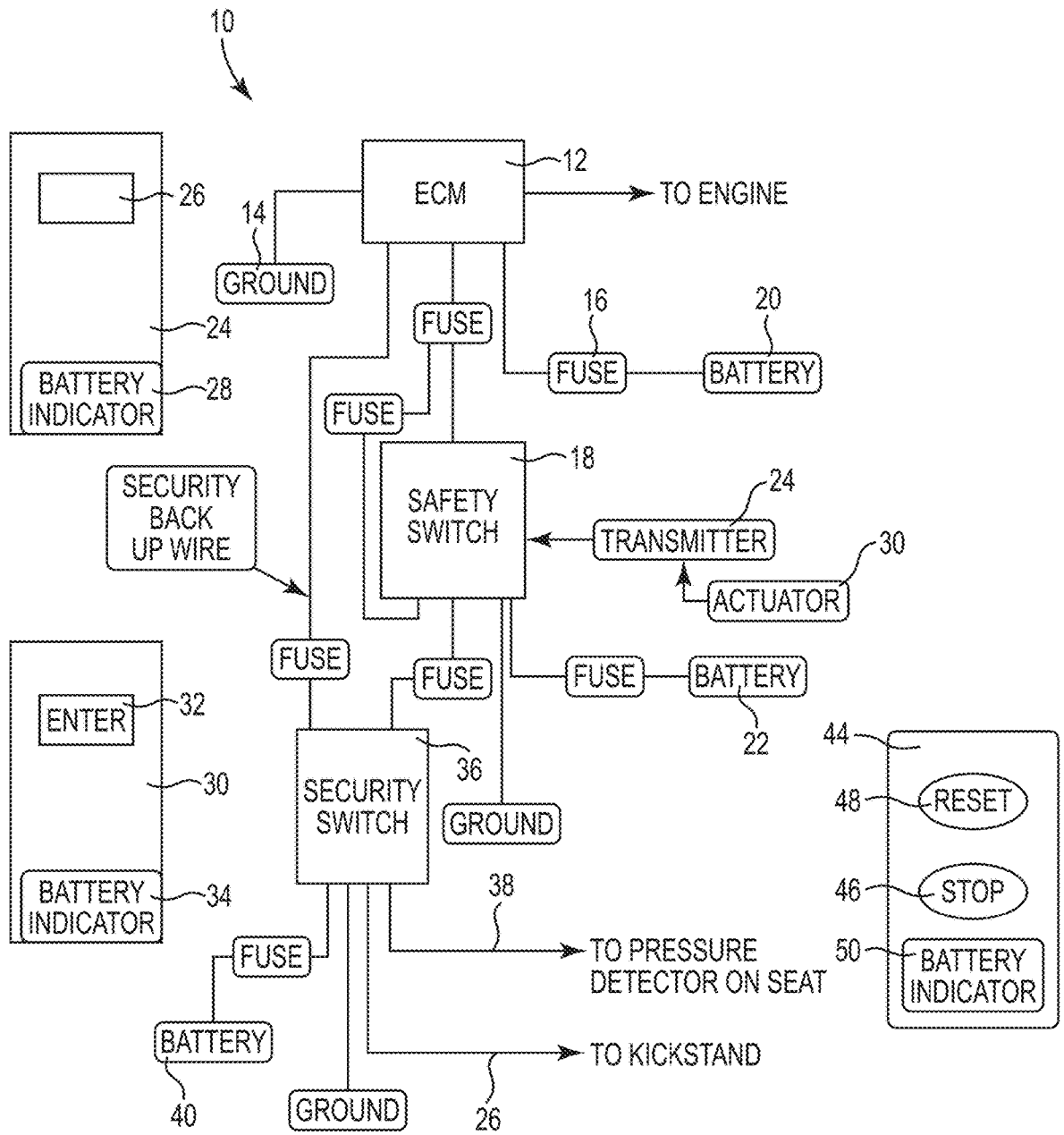
FIG. 4 is a schematic of an embodiment of the invention containing programmable safety switch and a programmable security switch and the motor vehicle has a kickstand in electrical communication with the programmable security switch.

Another embodiment of the invention described above is shown in FIG. 4 as a schematic of an embodiment of the invention containing programmable safety switch and a programmable security switch and the motor vehicle has a kickstand in electrical communication with the programmable security switch. The description of FIG. 4 is similar to that of FIG. 1 except for the following changes. The motor vehicle is one that also has a kickstand, such as a motorcycle and not an automobile or a truck. Another security wire (76) also is attached between programmable security switch 36 and a kickstand (not shown) such that such that programmable security switch 36 is able to stop the motor vehicle when receiving a ninth communication signal from first remote programmable receiver transmitter to show when kickstand is extended, the normally open programmable safety switch 18 is closed, and the engine is running for a preset time interval.

In addition, in some embodiments, an authority embodiment of the motor vehicle theft protection and disablement system also may be used by authority personnel to disable a motor vehicle stolen by another adverse party. Generally, this embodiment would result in minimal damage occurring to the motor vehicle or other innocent parties. This embodiment is configured to allow authority personnel to stop vehicles with less risk to themselves and other third parties.

Specifically, the authority embodiment of the motor vehicle theft protection and disablement system further comprises a normally closed programmable authority-activated switch and a second remote programmable receiver transmitter. The normally closed programmable authority-activated switch is configured to have four features, Firstly, it is in electrical communication with the electrical circuit and in electrical communication with the engine control module. Secondly, it has an open position that prevents power from running the engine upon reception of a voluntary twelfth communication signal to open from a second remote programmable receiver transmitter and a reclosed position upon reception of a voluntary thirteenth communication signal to close from the second remote programmable receiver transmitter. Thirdly, will achieve an open position upon reception of the twelfth communication signal from a second remote programmable receiver transmitter. Fourthly, will achieve a closed position upon reception of reception of the thirteenth communication signal from a second remote programmable receiver transmitter. In some embodiments, the normally closed programmable authority-activated switch comprises a programmable control apparatus electrically connected to the normally opened programmable safety switch that is in electrical communication with the electrical circuit. In other embodiments the normally open programmable safety switch, the normally closed automatic programmable security switch, and the normally closed programmable authority switch are one switch.

Figure 5:
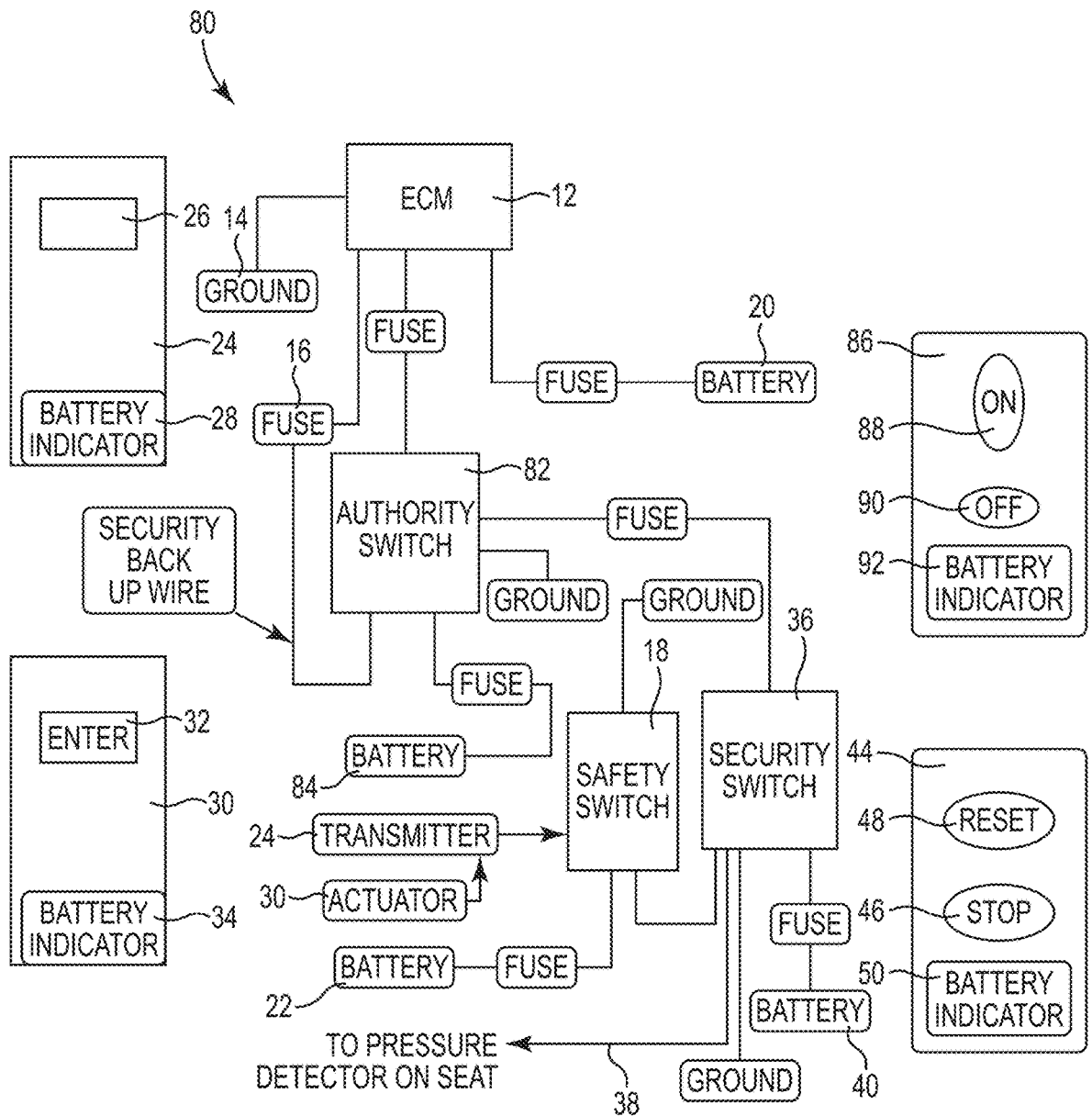
FIG. 5 depicts an embodiment having the elements of FIG. 1 and further having the new elements associated with the authority-activated switch and the second remote programmable receiver transmitter.

An embodiment of the invention that also includes the authority-activated switch and second remote programmable receiver transmitter is shown in FIG. 5. Elements already described retain the same numbers. FIG. 5 depicts the elements of FIG. 1 and further adds the new elements associated with the authority-activated switch and the second remote programmable receiver transmitter. The authority embodiment (80) includes ECM 12 that is physically and electrically attached to an engine (not shown) of a motor vehicle (not shown). Grounds 14 and fuses 16 are shown on a representative basis and not meant to be comprehensive or limiting. In this embodiment, motor vehicle battery 20 and an authority switch (82) are electrically attached to ECM 12, and programmable safety switch 18 and programmable security switch 36 are electrically attached to authority switch 82. Similar to the embodiments shown in FIG. 1, the switches and motor vehicle battery may be physically anywhere along the electrical circuit between battery 20 and the engine (not shown). Safety switch 18, security switch 38 and authority switch 72 are each powered separately by battery 22, battery 40, and a battery (84), respectively. Security wire 38 connects security switch 36 with a pressure detector (not shown) that is electrically in communication with the driver seat. Security switch 36 is connected to safety switch 18 in a manner able to detect if safety switch is closed when security wire 26 detects driver seat being vacant. Programmable transmitter 24 with a programmable processor 26 and powered by a separate battery with a battery indictor 28 to show how much power remains in programmable transmitter 24 is shown in wireless electrical communication with programmable safety switch 18. Programmable activator 30 is shown in electrical communication with programmable transmitter 24 through its programmable processor 26. Programmable actuator 30 has a close button 32 in electrical communication to programmable processor 26 in programmable transmitter 24 to allow programmable transmitter 24 to send a predetermined complex third signal to the normally opened programmable safety switch 18 to close to allow the motor vehicle to be started by conventional means. Programmable actuator 30 is powered by a separate battery with battery life indicator 34 to show how much power remains in programmable activator 30 and is shown in wireless electrical communication with programmable safety switch 24. Also shown is first remote transmitter 38 for resetting the security switch once it has been opened. First remote transmitter 38 is shown with "RESET" button 40 to transmit the second communication signal and "battery life" indicator 42. A second remote transmitter (86) is shown with "ON" button (88) to transmit the twelfth communication signal to open authority switch 72, "OFF" button (90) to transmit the thirteenth communication signal to close authority switch 82, and a "battery life" indicator (84).

Figure 6:
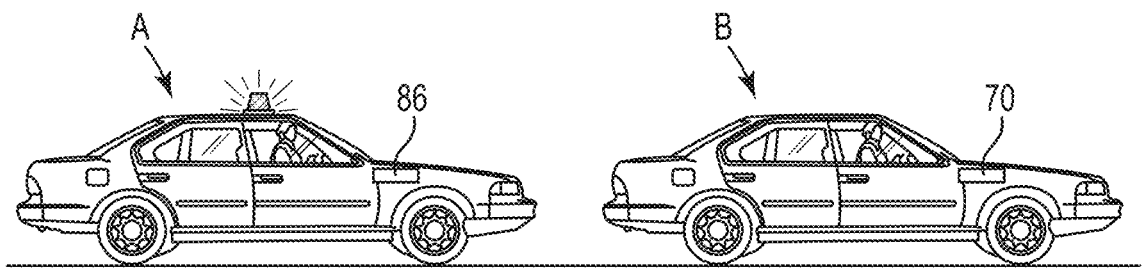
FIG. 6 is an illustration showing a motor vehicle with the embodiment shown FIG. 5 being stopped by an authority vehicle.

FIG. 6 is an illustration showing a motor vehicle with the embodiment shown FIG. 5 being stopped by an authority vehicle. FIG. 6 depicts vehicle A containing authority embodiment 80. Authority vehicle A having second remote transmitter 76 comes within transmission range and transmits a voluntary twelfth communication signal to open the normally closed authority switch to stop all cars within range. Because transmission is directional and traffic is light, only motor vehicle B is likely to be disabled. Pressing the RESET button sends a voluntary thirteenth communication signal from the second remote programmable receiver to close the authority switch(s) and allows the motor vehicle(s) that is stopped to resume normal operation.

The elements of our invention are readily available in the marketplace as we have invented a novel and unobvious combination of known elements to provide a new use. Programmable switches and keypad transmitters and remote transmitters are available from a number of electrical hardware suppliers. The switches may be individually separated or may be physically combined where programming capabilities permit more than one signal to be allowed for each ON and OFF function. One switch is physically possible here at least five signals may be programmed to open the switch and four may be programmed to close it. Signals five through eight are installed at manufacture and may not be changed by a system installer or owner. Some embodiments only combine the switches able to change the opened and closed state by receiving signals transmitted to a particular vehicle or switches able to change the state by receiving signals transmitted to any vehicle within range of the transmission.

Our invention is simple to use. Upon installation of the programmable safety switch and programmable security switch in a motor vehicle, and a predetermined third communication signal is entered into at least the programmable safety switch, programmable transmitter, and programmable activator, and a predetermined sixth communication signal is entered into the programmable security switch and first remote programmable receiver transmitter, the motor vehicle is ready to operate in a more secure manner. An authorized driver activates the programmable activator that transmits predetermined complex third communication signal to the programmable transmitter that then sends a first communication signal to change the normally opened safety switch to a closed position. The motor vehicle is now ready to start by normal means. When the motor vehicle engine is turned off, the programmable safety switch automatically opens to prevent the motor vehicle from being started again until a programmable activator is activated again. If a person, either authorized or unauthorized, enters the vehicle while it is unattended and the motor vehicle engine is turned off with the intention to start the car and drive it away, the vehicle will not start without the programmable activator being activated first. Hot-wiring the ignition will not cause the car to run. The programmable actuator is attached to the motor vehicle so there is no security code to forget as with the protection system of '721.

When the authorized driver is operating the motor vehicle and leaves the driver seat without turning off the engine or any door opens, the normally closed programmable security switch will automatically open and the motor vehicle will become disabled until a first remote transmitter communicates a predetermined complex sixth communication signal to close the programmable security switch. If the remote is not on the person of the driver or within the vehicle, arrangements must be made to have the remote transmitter brought to the vehicle. This is inconvenient if any door opens or the driver seat was vacated by the driver while the engine was running because of a driver's carelessness such as, for example, in trying to retrieve a forgotten item or quickly run into a store in the winter without turning off the motor vehicle. However, it is an effective deterrence to a carjacking as well as the poor practice of leaving a motor vehicle with a door running while leaving the motor vehicle for some reason such as, for example, to do, retrieve, buy something, or drop-off someone.

Once the motor vehicle is disabled, the predetermined complex sixth communication signal must be entered into the programmable security switch of the motor vehicle to close the open switch of the programmable security switch and allow the motor vehicle to be operated as described above using the programmable actuator. If the authorized driver is unable to locate the first remote programmable receiver transmitter with the predetermined complex sixth communication signal the driver has various other options. The driver can call the owner of the motor vehicle to learn if that person has the first programmable receiver transmitter and can get it to the authorized driver. The driver can contact an authorized system installation center for assistance or can have the motor vehicle brought to a motor vehicle service center and contact an authorized system installation center from there depending on circumstances of the disablement. Depending on embodiments, upon proper security clearance of the authorized driver, a temporary signal may permit operation until the vehicle is brought in and have a new first remote programmable receiver transmitter with the proper predetermined complex sixth communication signal. Alternatively, a center service person may visit the disabled vehicle to provide new first remote programmable receiver transmitter with the proper predetermined complex sixth communication signal. Other methods and procedures can be used as long as driver security is considered.

The first remote programmable receiver transmitter may also be used to transmit a voluntary fourth communication signal to the programmable security switch when the possessor of the first remote programmable receiver transmitter desires the programmable security switch to be open and the motor vehicle be disabled. Such a situation may occur when an adverse person, including a carjacking individual, who knows about the use of the programmable actuator tries to steal the motor vehicle. The possessor of the first remote programmable receiver transmitter may disable the motor vehicle by pressing the stop button on the first remote programmable receiver transmitter to transmit a fourth communication signal to the programmable security switch to open and stop the engine. As discussed above, the disabled motor vehicle then may only be started by the possessor of the first remote programmable receiver transmitter pressing the reset button to send a predetermined complex sixth communication signal to the programmable security switch to close. The motor vehicle may then operate as described above by activating the programmable activator and starting the motor vehicle by conventional means.

Other modifications and changes made to fit particular operating requirements, types of motor vehicles, and environments will be apparent to those with ordinary skill in the art. Thus, the invention is not considered limited to the embodiments discussed for purposes of disclosure and covers all changes and modifications that do not constitute departures from the true spirit and scope of this invention.

I claim:

1. A motor vehicle theft protection and disablement system, comprising, a motor vehicle comprising a pressure detector in communication with a driver seat, an engine and an electrical circuit in electrical communication with the engine, a battery in electrical communication with the engine, an engine control module in electrical communication with the battery and the engine that enables the engine to start stop or run, an input connector between and in electrical communication with both the battery and the engine control module, and an output connector between and in electrical communication with both the engine control module and the engine, wherein the engine control module controls factors that permit the internal combustion, electric, or hybrid engine to operate and run and permit the electrical circuit to be independent of a keyed ignition switch attached to a starter motor;

a normally open programmable safety switch is electrically connected to the electrical circuit of the motor vehicle, in electrical communication with the engine control module, configured to know if the engine is running or not running, and having an open position that prevents power from being able to turn on the engine and a closed position that permits power to be able to turn on the engine, and configured to achieve a closed position upon reception of a voluntary first communication signal and to achieve an open position upon reception of an automatic second communication signal when the engine is turned off;

a programmable transmitter comprising a processor and configured to (1) be in electrical communication with the electrical circuit of the motor vehicle and the normally open programmable safety switch and (2) transmit the voluntary first communication signal to the normally open programmable safety switch to achieve a closed position and allow the engine of the motor vehicle to be turned on through conventional means upon the input of a voluntary predetermined complex activation third communication signal from a group consisting at least of a predetermined negative image of a person's own face to the processor in the programmable transmitter;

a programmable activator in electrical communication with the processor of the programmable transmitter and configured to transmit on demand to the processor in the programmable transmitter the voluntary predetermined complex activation third communication signal;

a normally closed programmable security switch that is configured to (1) be in electrical communication with the normally open programmable safety switch and the electrical circuit of the motor vehicle, and able to detect when the normally open programmable safety switch achieves a closed position, the engine has been turned on, and the pressure detector that is in communication with the driver seat, (2) have an open position that prevents power from running the engine and a closed position that does not prevent power from running the engine, (3) achieve the open position upon reception of (a) a voluntary predetermined fourth communication signal from a first remote programmable receiver transmitter or (b) an automatic predetermined fifth communication signal showing that a pressure on the pressure detector does not register at least a predetermined amount of pressure showing the diver seat is not occupied, and the engine is running for a predetermined period of time after the pressure is below at least the predetermined amount of pressure, and (4) achieve the closed position from the open position upon reception of a voluntary predetermined complex sixth communication signal from the group consisting at least of a predetermined negative image of a person's own face from the first remote programmable receiver transmitter; and the first remote programmable receiver transmitter in electrical communication with the normally closed programmable security switch and the electrical circuit of the motor vehicle and configured (1) to be able to transmit on demand the voluntary predetermined fourth communication signal to the normally closed programmable security switch to move the normally closed programmable security switch to the open position and (2) to be able to transmit on demand when the normally closed programmable security switch is in the open position the voluntary predetermined complex sixth communication signal to the open but normally closed programmable security switch to move it to the closed position.

2. The motor vehicle theft protection and disablement system of claim 1 wherein the voluntary predetermined complex activation third communication signal and the voluntary predetermined complex activation sixth communication signal are from a group further consisting of a list of a predetermined number and type of characters or words numbering in excess of 20.

3. The motor vehicle theft protection and disablement system of claim 1 wherein the voluntary predetermined complex activation third communication signal and the voluntary predetermined complex activation sixth communication signal are from a group further consisting of a predetermined thermal image of a person's own face.

4. The motor vehicle theft protection and disablement system of claim 1 wherein the voluntary predetermined complex activation third communication signal and the voluntary predetermined complex activation sixth communication signal are from a group further consisting of a preselected light beam with a predetermined range of wavelengths and range of frequencies.

5. The motor vehicle theft protection and disablement system of claim 1 wherein the voluntary predetermined complex activation third communication signal and the voluntary predetermined complex activation sixth communication signal are from a group further consisting of a predetermined movement.

6. The motor vehicle theft protection and disablement system of claim 1 wherein the voluntary predetermined complex activation third communication signal and the voluntary predetermined complex activation sixth communication signal are from a group further consisting of a predetermined inanimate or action image that is private and non-copyrightable such as a person's room, pet, or body part such as, for example, a hand, elbow, or knee that may be clothed or unclothed and that may be a normal, a negative, or a thermal image.

7. The motor vehicle theft protection and disablement system of claim 1 further comprises a "valet switch" comprising a wired or wireless transmitter able to transmit the predetermined complex activation seventh communication signal to the programmable transmitter for a predetermined period of time, keep the normally closed programmable security switch in a closed position, and not be considered a remote transmitter but a bypass switch.

8. The motor vehicle theft protection and disablement system of claim 1 wherein the predetermined complex activation third communication signal and the predetermined complex activation sixth communication signal are the same, from the same group, or from different groups.

9. The motor vehicle theft protection and disablement system of claim 1 wherein the normally open programmable safety switch is physically and electrically attached to the input connector.

10. The motor vehicle theft protection and disablement system of claim 1 wherein the input connector further comprises a fuse and the normally open programmable safety switch is physically and electrically attached to the input connector between the fuse and the engine control module.

11. The motor vehicle theft protection and disablement system of claim 1 wherein the normally open programmable safety switch comprises a programmable control apparatus electrically connected to the normally open programmable safety switch.

12. The motor vehicle theft protection and disablement system of claim 1 wherein the programmable safety switch and the programmable security switch are one switch.

13. The motor vehicle theft protection and disablement system of claim 1, wherein
  the motor vehicle further comprises at least one door and
  the normally closed programmable security switch also is configured to (1) be in electrical communication with the door, the normally open programmable safety switch, and the electrical circuit, and configured to be able to detect when the door is open while the normally open programmable safety switch is closed and the engine is running for a preset amount of time, (2) have an open position that prevents power from running the engine and a closed position that does not prevent power from running the engine, (3) achieve the open position upon reception of an automatic eighth communication signal that the door is open, the normally open programmable safety switch is closed, and the engine is running for a predetermined amount of time, and (4) achieve a closed position upon reception of a predetermined complex activation sixth communication signal from the first remote programmable receiver transmitter.

14. The motor vehicle theft protection and disablement system of claim 1, wherein the motor vehicle further comprises a speedometer and an acceleration device that is in electrical communication with the engine control module, and
  the normally closed programmable security switch also is configured to (1) be in electrical communication with the acceleration device and the normally open programmable safety switch, and configured to be able to receive the voluntary predetermined fourth communication signal when the motor vehicle needs to be stopped because of unauthorized use and the normally open programmable safety switch is closed, (2) have an open position that is configured to cause the acts of (a) preventing power from accelerating the engine to decrease the speed of the motor vehicle to a predetermined amount and (b) stopping the running of the engine when the speed is below a predetermined level, (3) achieve within a preset time interval of the acts of (2) (a) and (2) (b) upon reception of the voluntary predetermined fourth communication signal, and (4) achieve a closed position upon reception of the predetermined complex activation sixth communication signal from the first remote programmable receiver transmitter.

15. The motor vehicle theft protection and disablement system of claim 1, wherein the motor vehicle further comprises a kickstand and
  the normally closed programmable security switch also is configured to (1) be in electrical communication with the kickstand, the normally open programmable safety switch and the engine control module, and able to detect when the kickstand is extended or retracted, the normally open programmable safety switch is open, and the engine is running, (2) have an open position that prevents power from running the engine when the kickstand is extended, the normally open programmable safety switch is open, and the engine is running, (3) achieve an open position upon reception of an automatic ninth communication signal that the kickstand is extended, the normally open programmable safety switch is closed, and the engine is running all for a preset time interval, and (4) achieve a closed position upon reception of a predetermined complex activation sixth communication signal from the first remote programmable receiver transmitter.

16. The motor vehicle theft protection and disablement system of claim 1, wherein the first remoter programmable receiver transmitter is further configured (3) to be able to start a motor vehicle from a distance of up to 300 feet by (a) sending a voluntary predetermined complex tenth signal to turn off the programmable security switch, closing the programmable safety switch, and start the motor vehicle, and (4) when the door is opened, to be able to turn off the motor vehicle, turn on the programmable security switch and open the programmable safety switch.

17. The motor vehicle theft protection and disablement system of claim 14, further comprises,
  a WiFi engaged application in communication with the motor vehicle and the programmable security switch and
  the first remoter programmable receiver transmitter is further configured (5) to be able to show the location of the motor vehicle by being configured to send a voluntary complex eleventh signal to the application to enable the application to communicate the location of the motor vehicle to a display on the first remoter programmable receiver transmitter receiver and (6) send a voluntary fourth communication signal through the application to the programmable security switch to stop the motor vehicle.

18. The motor vehicle theft protection and disablement system of claim 1, further comprising,
  a normally closed programmable authority-activated switch configured to (1) be in electrical communication with the electrical circuit and in electrical communication with the engine control module, (2) have an open position that prevents power from running the engine upon reception of a voluntary twelfth communication signal to open from a second remote programmable receiver transmitter and a reclosed position upon reception of a voluntary thirteenth communication signal to close from the second remote programmable receiver transmitter, and
  the second remote programmable receiver transmitter in electrical communication with the normally closed programmable authority-activated switch and configured to be able to transmit the voluntary predetermined twelfth communication signal to the normally closed programmable authority-activated switch to move it to an open position and to transmit the voluntary predetermined thirteenth communication signal to move the programmable authority-activated switch to a closed position.

19. The motor vehicle theft protection and disablement system of claim 18 wherein the normally closed programmable authority-activated switch comprises a programmable control apparatus electrically connected to the normally opened programmable safety switch that is in electrical communication with the electrical circuit.

20. The motor vehicle theft protection and disablement system of claim 18 wherein the normally open programmable safety switch, the normally closed automatic programmable security switch, and the normally closed programmable authority switch are one switch.

* * * * *